United States Patent
Keer et al.

(10) Patent No.: US 9,566,931 B2
(45) Date of Patent: Feb. 14, 2017

(54) STRUCTURE FOR RECEIVING AN INFLATABLE AIRBAG AND VEHICLE SEAT WITH SUCH A STRUCTURE

(71) Applicant: Isringhausen GmbH & Co. KG, Lemgo (DE)

(72) Inventors: Andreas Keer, Lemgo (DE); Uwe Piepenbrink, Lage (DE)

(73) Assignee: Isringhausen GmbH & Co. KG, Lemgo (DE)

( * ) Notice: Subject to any disclaimer, the term of this patent is extended or adjusted under 35 U.S.C. 154(b) by 0 days.

(21) Appl. No.: 14/796,570

(22) Filed: Jul. 10, 2015

(65) Prior Publication Data
US 2016/0280175 A1  Sep. 29, 2016

(30) Foreign Application Priority Data
Mar. 23, 2015  (DE) ........................ 10 2015 003 790

(51) Int. Cl.
*B60R 21/207*  (2006.01)
*B60R 21/215*  (2011.01)
*B60R 21/216*  (2011.01)

(52) U.S. Cl.
CPC .......... *B60R 21/207* (2013.01); *B60R 21/215* (2013.01); *B60R 21/216* (2013.01); *B60R 2021/2076* (2013.01)

(58) Field of Classification Search
CPC ..... B60R 21/207; B60R 21/216; B60R 21/215
See application file for complete search history.

(56) References Cited

U.S. PATENT DOCUMENTS

| | | | |
|---|---|---|---|
| 6,189,916 B1 * | 2/2001 | Bowers | B60R 21/207 280/728.2 |
| 6,431,583 B1 * | 8/2002 | Schneider | B60R 21/206 280/728.2 |

(Continued)

*Primary Examiner* — Faye M Fleming
(74) *Attorney, Agent, or Firm* — Abelman, Frayne & Schwab (57) ABSTRACT

The invention relates to a structure for receiving an inflatable airbag 25 which is located in a housing of an airbag module 21, with a decorative cover 1 for covering a component of a vehicle seat 4, wherein the decorative cover 1 has a front decorative cover area 2 and a rear decorative cover area 3, wherein the front decorative cover area 2 and the rear decorative cover area 3 are connected to each other in the area of their edge sections via a first connection 5 which can be released when the airbag 25 is deployed, wherein the front decorative cover area 2 has a first outer surface 6 and a first inner surface 7 and the rear decorative cover area 3 has a second outer surface 8 and a second inner surface 9, with a first support bar 10 made of a rigid material, which has at least one through hole 15 for receiving a connection pin 24 which is formed on the housing of the airbag module 21, and which has fastening means for fastening a first protective sheet 16, wherein the first support bar 10 has a front area 11 which, in the installed position, lies in front of the at least one through hole 15 in the direction of travel, with a first protective sheet 16 which has a third outer surface 17 and a third inner surface 18, wherein the first protective sheet 16 is made of a material which is tear-resistant when the airbag 25 is deployed, wherein the first protective sheet 16 is connected to the first support bar 10 in its front area via a second connection 12 which cannot be released when the airbag is deployed, such that its third inner surface 18 faces the first support bar 10, and the first protective sheet 16 is connected to the front decorative cover area via a third connection 19 which cannot be released when the airbag 25 is deployed, such that the third inner (Continued)

surface 18 of the first protective sheet 16 is opposite the first inner surface 7 of the front decorative cover area 2 in the area of its edge sections.

The invention also relates to a vehicle seat 4 which comprises a corresponding structure, as well as a method for assembling an airbag 25 in a vehicle seat 4 and a use of a documentation-capable assembly device for checking the correct positioning and the proper fixing of an airbag module 21 and a protective sheet 16, 32 to a vehicle seat 4.

14 Claims, 6 Drawing Sheets

(56) References Cited

U.S. PATENT DOCUMENTS

| | | | | |
|---|---|---|---|---|
| 6,439,597 | B1* | 8/2002 | Harada | B60R 21/207 280/728.2 |
| 2006/0131848 | A1* | 6/2006 | Miyake | B60R 21/207 280/730.2 |
| 2008/0073952 | A1* | 3/2008 | Tracht | B60R 21/207 297/216.13 |
| 2008/0100044 | A1* | 5/2008 | Cho | B60R 21/207 280/730.2 |
| 2009/0051148 | A1* | 2/2009 | Osterhout | B60R 21/207 280/728.3 |
| 2015/0251623 | A1* | 9/2015 | Fujiwara | B60R 21/207 280/728.2 |
| 2015/0336528 | A1* | 11/2015 | Tanabe | B60R 21/207 280/728.2 |

\* cited by examiner

STRUCTURE FOR RECEIVING AN INFLATABLE AIRBAG AND VEHICLE SEAT WITH SUCH A STRUCTURE

The invention relates to a structure for receiving an inflatable airbag which is located in a housing of an airbag module, to a decorative cover for covering a component of a vehicle seat, and to a vehicle seat with such a structure.

DE 600 25 555 T2 describes an assembly with trim cover for a vehicle seat for receiving an airbag which is located in an airbag module. The assembly with trim cover has two areas of lining which guide the inflating airbag through an opening in the decorative cover without the airbag damaging the foam cushion of the vehicle seat. This is also described in DE 203 20 012 U1. For this, the two areas of lining are sewn to the edges of the opening. In addition, at their other edges the areas of lining have holes, through which connection pins of the airbag module have to be pushed in order then to be able to be screwed to the frame of the vehicle seat. The assembly of the airbag module with fixing to the frame is complicated because each connection pin has to be pushed in each case through a hole in each of the areas of lining. If a hole is omitted, then the areas of lining cannot fulfil their guiding function when the airbag is deployed, because at least one area of lining is not connected to the frame. Damage to the cushion then routinely results. In order to avoid this, expensive manufacturing-related measures and controls, for example via camera systems, have to be carried out.

An object of the invention is to provide a structure for receiving an inflatable airbag in a vehicle seat which can be more easily connected to the frame of the vehicle seat. The object also extends to a vehicle seat with these properties. A further object is to provide measures in order to be able to check the correctly positioned assembly of the important parts of the whole system despite the simplified assembly.

This object is achieved by a structure with the features of claim 1. The firm second connection between the first protective sheet and the first support bar prevents the connection pins of the airbag module from having to be pushed through a thin film, which undulates and is easily movable. It is much simpler to push the connection pins through the through hole in the rigid first support bar. In addition, this assembly is significantly simpler because the airbag module need not be slid into a flexible tube formed of two protective sheets; according to the invention only a single, the first, protective sheet is provided. This is sufficient because this first protective sheet protects the cushion when the airbag is deployed in the direction of the user of the vehicle seat, and no destruction of the cushion can occur in this area. Destruction of the cushion in an area with which the user does not come into contact and for which there is no protective sheet is acceptable. Because of the structure according to the invention, the assembly of the airbag module can be significantly simpler to carry out than with a device according to the state of the art.

A further advantageous development of the invention provides that there is a second support bar made of a rigid material, which has at least one through hole for receiving a connection pin which is formed on the housing of the airbag module, and which has fastening means for fastening a second protective sheet, wherein the second support bar has a rear area which, in the installed position, lies behind the at least one through hole in the direction of travel, with a second protective sheet which has a fourth outer surface and a fourth inner surface, wherein the second protective sheet is made of a material that is tear-resistant when the airbag is deployed, wherein the second protective sheet is connected to the second support bar in its rear area via a fourth connection that cannot be released when the airbag is deployed, such that its fourth inner surface faces the second support bar, and the second protective sheet is connected to the rear decorative cover area via a fifth connection that cannot be released when the airbag is deployed, such that the fourth inner surface of the second protective sheet is opposite the second inner surface of the rear decorative cover area in the area of its edge sections. Although the second protective sheet increases the outlay on assembly, the cushion is also protected in the rear area against destruction when the airbag is deployed. Although this is not obligatory on the basis of the above-named safety for the user, it is advantageous, because no part of the cushion is destroyed.

An advantageous development of the invention provides that the first and/or second support bar has two through holes lying one above the other in the installed position, for receiving two connection pins formed on the housing of the airbag module. The airbag module is thereby prevented in a simple manner from still being able to turn about the axis of a single connection pin after the assembly on the frame; which could lead to intolerable destruction of the cushion when the airbag is deployed. This design is simpler to implement than any other mechanism for preventing turning when only one connection pin is used; for example using a polygonal end on the connection pin which slots into an opening having the inverse shape on the frame.

A further advantageous development of the invention provides that the first and/or second support bar is formed of a stiff, impact-resistant plastic or a stiff metal or a stiff metal alloy. The use of these materials, in particular of the plastic, leads to a very simple production possibility for the support bar(s) and a good possibility for producing the second or third connection between the first or second support bar and the first or second protective sheet.

A further advantageous development of the invention provides that the first and/or second support bar has a thickness of from 1.5 to 10 mm, preferably 2 to 5 mm. Below the lowest value of the thickness, a documentation-capable assembly device, for example an electronic torque-angle wrench, cannot securely recognize whether the first and/or second support bar is located between the airbag module and the frame. If the highest value is exceeded, the airbag module moves so far in the direction of the cushion that it detracts from the design aesthetics of the vehicle seat because of a bulge at this site.

A further advantageous development of the invention provides that the second connection and/or the third connection and/or the fourth connection is a seam, an adhesive connection or a welded connection. These types of connections are very simple to produce and offer the security required for them to hold in the case of the airbag being deployed.

A further advantageous development of the invention provides that, by means of the first connection, the first protective sheet is additionally also fixed with its third inner surface against the first inner surface of the front decorative cover and/or the second protective sheet is fixed with its fourth inner surface against the second inner surface of the rear decorative cover. It is thereby guaranteed that the first and/or second protective sheet is not separated from the decorative cover unintentionally or prematurely, possibly destroying the cushion in the area which faces the user.

A further advantageous development of the invention provides that the second connection comprises a first partial connection and a second partial connection, wherein in the case of the first partial connection the third outer surface of the first protective sheet and the surface of the first support bar aligned outwards in the installed state rest against each other, and wherein the second partial connection comprises the first protective sheet doubled, wherein here too the third outer surface and the surface of the first support bar aligned outwards in the installed state rest against each other, and at the same time, in the case of the doubling, the third inner surface of the first protective sheet faces the first support bar. It is thus ensured that when the airbag is deployed the second connection between the first protective sheet and the first support bar cannot be unintentionally released because of the large force acting on it. A release of the second connection would very probably have the result that, when inflated, the airbag would destroy the cushion in an area facing the user.

A further advantageous development of the invention provides that the fourth connection comprises a third partial connection and a fourth partial connection, wherein in the case of the third partial connection the fourth outer surface of the second protective sheet and the surface of the second support bar aligned outwards in the installed state rest against each other, and wherein the third partial connection comprises the second protective sheet doubled, wherein here too the fourth outer surface and the surface of the second support bar aligned outwards in the installed state rest against each other, and at the same time, in the case of the doubling, the fourth inner surface of the second protective sheet faces the second support bar. It is thus ensured that when the airbag is deployed the fourth connection between the second protective sheet and the second support bar cannot be unintentionally released because of the large force acting on it. A release of the fourth connection would very probably have the result that, when inflated, the airbag would destroy the cushion in its partial area which lies behind the slit in the direction of travel.

The object is also achieved by a vehicle seat with the features of claim 7. The advantages named above in connection with the structure are also achieved for the vehicle seat by such a design. The assembly of the airbag module is significantly simpler to effect than is known from the state of the art. In addition to the simpler insertion of the airbag module—as has already been explained above within the framework of the designs for the structure—the fixing to the frame is also significantly simpler to implement.

A further advantageous development of the invention provides that at its or their ends the connection pin or the connection pins has or have external threads which interact with internal threads on the fixing means, which are in particular formed as nuts. These are simple means which very reliably enable a fixing. In particular if a first and/or second support bar made of a plastic is used, if a documentation-capable assembly device is used, for example an electronic torque-angle wrench, it can be recognized and documented, during the tightening of the fixing means, preferably nuts, on the basis of the torque curve and the screwing angle still applied from a snug torque threshold during the tightening, that the first and/or second support bar is assembled between the frame and the airbag module. For this, for example, a rotation angle check can also be performed. A monitoring and documentation with camera systems or using a four-eyes principle is thereby no longer necessary.

A further advantageous development of the invention provides that the housing of the airbag module has a pivotable cover which, when the airbag is in the deployed state, pushes the part of the cushion lying behind the slit relative to the front side of the vehicle seat outwards away from the first and/or second support bar. Even if only one protective sheet is used—for the front area of the cushion facing the user—it is thereby achieved that destruction of the rear part of the cushion not facing the user is also avoided. Because the cushion part is pushed away, the slit in the cushion is opened and thus the firing channel for the airbag is created without the airbag having to create this itself along protective sheets—which leads to destruction of the cushion if there are no protective sheets.

The further object is achieved by a method with the features of claim 13. Because the data from the documentation-capable assembly device—in this case, for example, an electronic torque-angle wrench—are evaluated and archived, it is possible, using the curve of the torque and of the rotation angle during the tightening of the screw connection—in this case, for example, nuts which are tightened on connection pins—to establish and document whether the support bar—and thus also the protective sheet connected to it—has also been screwed in place between the airbag module and the frame. If the support bar is not in the correct place, a different curve results for the torque and the screwing angle still applicable from a first snug torque threshold until a second snug torque threshold is reached. Thus it is clearly to be established whether the assembly has been carried out correctly. Should the assembly of the airbag module and in particular the assembly of the first protective sheet have been carried out incorrectly, the cushion would not be protected, as provided, by the protective sheet, when the airbag is deployed, and it would thus be destroyed.

An advantageous development of the method according to the invention provides that a torque-angle wrench is used as documentation-capable assembly device and by means of the torque-angle wrench it is detected by what rotation angle the fixing means, in particular a nut, can still continue to be rotated after a first torque threshold has been reached, until a second torque threshold is reached. If the support bar is not present, this rotation angle is significantly smaller than if the support bar is present. As a result, the correct positioning of the support bar between the frame and the airbag module can be checked by evaluating the rotation angle.

The further object is also achieved by the use of the documentation-capable assembly device during the fixing of the airbag module and the protective sheet to the vehicle seat according to claim 14. The check of the correct positioning and the proper fixing can thereby be achieved.

Further advantages and details of the invention are explained with reference to the embodiment example represented in the figures. There are shown in:

FIG. 1 a perspective view of the backrest of a vehicle seat according to the invention, FIG. 2 a horizontal section through the left-hand end area of the backrest of FIG. 1 in a first state in which the airbag is not deployed, FIG. 3 a horizontal section like in FIG. 2, in a second state in which the airbag is inflating, FIG. 4 a second embodiment example as a modification of the first embodiment example according to FIG. 2 with a second protective sheet, FIG. 5 a third embodiment example as a modification of the second embodiment example according to FIG. 4 with an additional connection and FIG. 6 a fourth embodiment example as a modification of the third embodiment example according to FIG. 5 with an additional connection.

Figure 1:
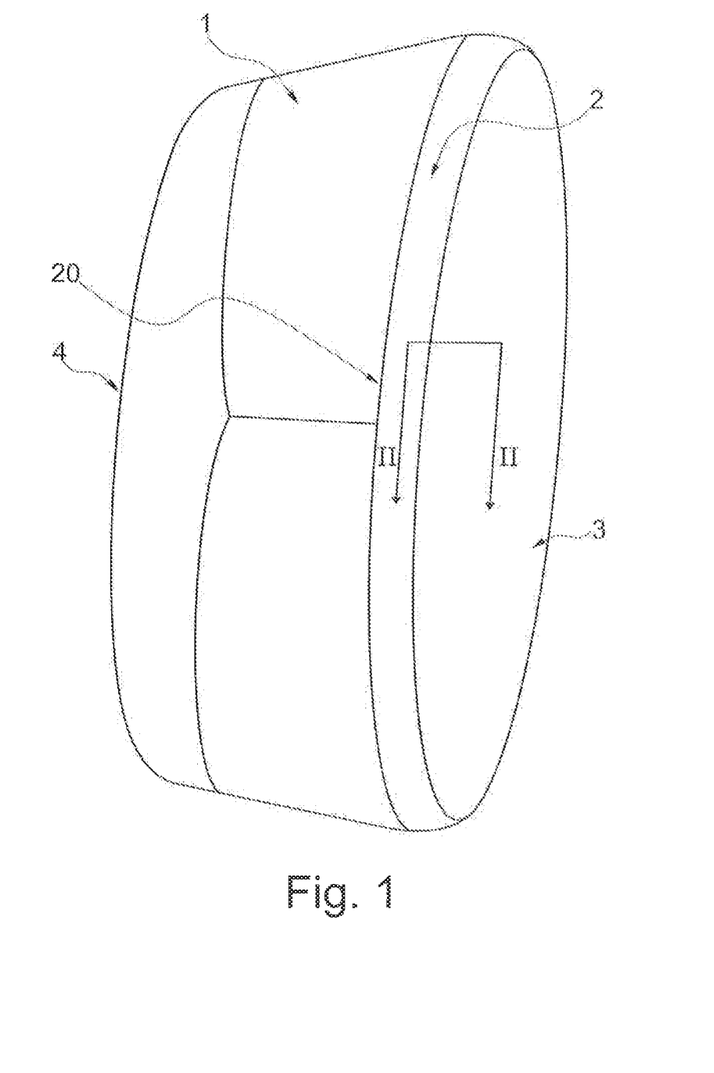
Figure 2:
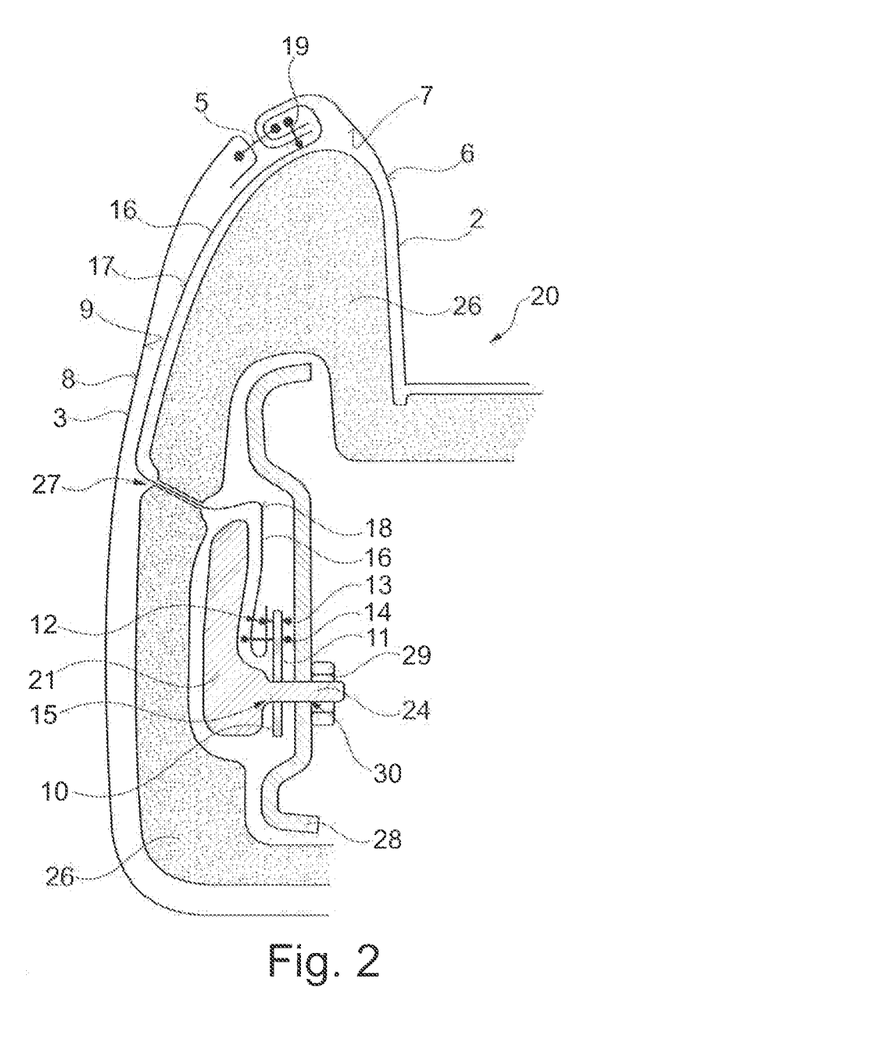
Figure 3:
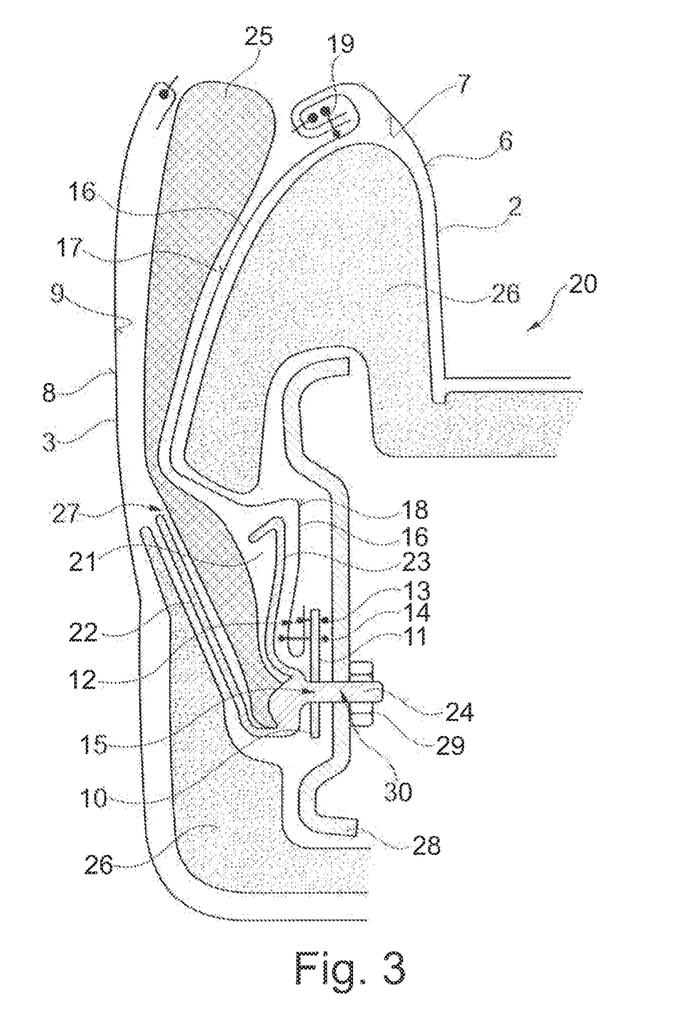

An embodiment example of a structure according to the invention as part of a vehicle seat 4 according to the invention is represented in FIGS. 1 to 3. The structure according to the invention is not visible in FIG. 1—which is represented on a smaller scale than the rest of the figures—because it is covered by a decorative cover 1. All figures are schematic representations.

In FIG. 1 a backrest of the vehicle seat 4 is seen from the front at an angle, with the result that the view is onto a seat area 20 in which a user of the vehicle seat 4 rests his back. The decorative cover 1 has a front decorative cover area 2 which is located in the area of the seat area 20 and the front part of the side of the backrest, and a rear decorative cover area 3 which is located in the rear part of the side of the backrest and in the back side area of the backrest (not visible in FIG. 1).

A horizontal section of the side area of the backrest represented on the right in FIG. 1 is represented in FIGS. 2 and 3 in each case. FIG. 2 shows the state before an airbag 25 of an airbag module 21 inserted in the vehicle seat 4 is deployed and FIG. 3 shows a state while the airbag 25 is inflating after the airbag module 21 has been deployed.

The state according to FIG. 2 is described first.

An airbag module 21 is fastened to a supporting structure of the vehicle seat 4, here a vertically running frame 28. For this the airbag module 21 has a connection pin 24 with an external thread at its free end. The connection pin reaches through a fastening hole 30 in the frame 28 and is fixed to the frame 28 by means of a fixing means 29 in the form of a nut, the internal thread of which is matched to the external thread of the connection pin 24.

A first support bar 10 is arranged between the housing of the airbag module 21, which is composed of a base body 23 and a cover 22 (both visible in FIG. 3), and the frame, wherein the connection pin 24 of the airbag module 21 reaches through a through hole 15 in the first support bar 10. The first support bar 10 has a front area 11 which is formed in front of (in FIG. 2 two above) the through hole 15. The first support bar 10 is made of an impact-resistant plastic, such as for example polypropylene, and has a length (perpendicular to the plane of drawing) of approx. 18 cm and a width (vertical direction in FIG. 2) of approx. 3 cm as well as a thickness of approx. 3 mm.

Frame 28, first support bar 10 and airbag module 21 are enclosed by a cushion 26 which has a vertical slit 27 which is arranged slightly in front of the front end (in FIG. 2 in front is represented above in relation to the vehicle seat 4) of the airbag module 21. The slit 27 divides the cushion 26 into a front and a rear area.

The decorative cover 1 is stretched over the cushion 26. It has a front decorative cover 2 and a rear decorative cover 3 which are connected to each other in the area of their edges via a first connection 5. The first decorative cover area 2 has a first outer surface 6, which faces away from the cushion 26, and a first inner surface 7, which rests against the cushion 26. This applies analogously in respect of a second outer surface 8 and a second inner surface 9 of the rear decorative area 3. The first connection 5 is designed such that it opens when the airbag module 21 is deployed and the airbag 25 can emerge from the vehicle seat 4 through the gaps that form (see FIG. 3). The first connection 5 is designed for example as a seam, wherein a person skilled in the art knows what types of seams are used—for example a standard seam, a double lap seam, a simple lap airbag seam, a welt seam or an English edge—and the respective outer surfaces 6, 8 of the two decorative cover areas 2, 3 rest against each other.

A first protective sheet 16 made of a tear-resistant material which effects the protection of the seat cushion 26 while the airbag 25 is unfolding extends between the front decorative cover 2 and the first support bar 10. Such materials are known to a person skilled in the art. They can be for example a woven or non-woven material which can contain natural or synthetic materials, such as for example nylon. One material which has proved to be effective is a polyester material of the type from which the airbag 25 can be produced. The sheet material can be flexible or elastic. Irrespective of the type of material which is used to produce the airbag guide—which is formed by the first protective sheet 16, the part of the cushion 26 arranged behind the slit 27 and the rear part of the slit 26—the use of the airbag guide can be instrumental in reducing friction on the airbag 25 when it is unfolded. Although a polymer, such as for example nylon, can be particularly advantageous, the friction on the airbag 25 is also reduced by a non-woven material. This is to be attributed to the fact that the airbag guide prevents contact between the unfolding airbag 25 and the seat cushion 26 and contributes to preventing small particles from detaching from the seat cushion 26 and entering the vehicle interior. The tear resistance has to be high enough that the first protective sheet 16 does not tear when the airbag 25 is inflated. The first protective sheet 16 has a third inner surface 18 which points away from the frame 28 and a third outer surface 17 which is opposite the frame 28. The first protective sheet 16 has a height of from approximately 10 to 25 cm—preferably approx. 18 cm—which approximately corresponds to the height of the first support bar 10. It—as well as the height of the first support bar 10—is matched to the height of the slit 27 in the cushion 26 and designed slightly smaller than the latter, in order that the first protective sheet 16, including the first support bar 10, can be guided well through the slit 27 during assembly.

The first protective sheet 16 is connected in a tear-resistant manner to the front area 11 of the first support bar 10 via a second connection 12. The second connection 11 must not tear during inflation of the airbag 25. In the first embodiment example represented, the second connection 12 is composed of a first partial connection 13 and a second partial connection 14. The first partial connection 13 is formed in the area of the edge. Here the third outer surface 17 rests against the first support bar 10. The first protective sheet 10 extends from the first partial connection 13 in FIG. 2 firstly downwards as far as the second partial connection 14. There the first protective sheet 16 changes its direction by 180°—it is thus turned up at this site, with the result that it is doubled upwards from there in FIG. 2, with the result that the third inner surfaces 18 on the two sheets come to rest against each other. For this, the second partial connection 14 comprises both sheets and the first support bar 10. For the two partial connections 13, 14 in each case a seam can be produced from one thread, wherein the thread is pushed through the plastic of the first support bar 10 by means of a suitable needle.

The first protective sheet 10 extends from the second connection 12 away through the slit 27 in the cushion 26. It is connected in a tear-resistant manner to the front decorative cover 2 via a third connection 19 in the area of the edges of the first protective sheet 16 and of the front decorative cover 2. In respect of the tear resistance, the statements regarding the second connection 12 apply analogously. The first inner surface 7 of the front decorative cover 2 and the third inner surface 18 of the first protective sheet 16 rest against each other.

In the embodiment example represented the first protective sheet 16 is also comprised by the first connection 5 in the area of which the same surfaces of the front decorative cover 2 and of the first protective sheet 16 as for the third connection 19 rest against each other.

It cannot be seen from FIG. 2 that there are two through holes 15 lying one above the other in the first support bar 10 and two fastening holes 30 matched thereto in the frame 26 which are pierced by two connection pins 24 likewise matched thereto and are fixed in each case with a nut 24. The use of two connection pins 24 serves to create a simply designed securing against turning of the airbag module 21 relative to the frame 28. With a correspondingly larger outlay on design, only one connection pin 24 could also be used, for example using a square end on the connection pin 24 which interacts with a corresponding square end on the frame 28.

In respect of the representation of FIG. 3, predominantly the same as in FIG. 2 is shown. In the following only the parameters that are altered by the different state of the airbag module 21—it has been deployed and the airbag 25 has already partially inflated—compared with FIG. 2 are described.

The airbag module 21 has a housing, which is connected to the connection pin 24 and which has a stationary base body 23, and a cover 22 that is rotatable thereto about an axis running vertically in FIG. 3. Unlike in FIG. 2, in which the housing is represented still in the closed state because the airbag module 21 has not yet been deployed, the airbag module 21 in FIG. 3 is already opened and the airbag 25 has emerged from the housing. When the airbag module 21 is deployed the cover 22 in FIG. 3 is pivoted to the left because of the inflating airbag 25 and presses onto the cushion 26 in the area lying behind the slit 27. As the cushion 26 is a compressible material, for example a foam made of polyurethane (PUR), this is pressed by the cover outwards against the second inner surface 9 of the rear decorative cover area 3 and compressed. The slit 27 in the cushion 26, through which the airbag 25 passes during inflation, thereby opens. On the front side the airbag 25 is guided by the first protective sheet 16, with the result that it cannot damage or destroy the cushion in the area lying behind the first protective sheet 16. A firing channel for the airbag 25, on the path of which it leaves the cushion 26 undamaged, is thus formed between the cover 22 and the first protective sheet 16. This also applies to the area behind the slit 27, as the cushion 26 is protected there by the cover 22—only the above-mentioned compression of the cushion 26, but no damage, results in this area.

After the airbag 25 has passed through the slit 27 it presses onto the decorative cover 1. If the pressure becomes too great, the first connection 5 tears and releases the path for the airbag 25 through the decorative cover and ultimately out of the vehicle seat 4, with the result that the airbag 25 can arrive at the position necessary to protect the occupant of the vehicle seat 4.

Through the combination of decorative cover 1, first protective sheet 16 and first support bar 10 including second connection 12 between the first support bar 10 and the first protective sheet 16, and third connection 19 between the front decorative cover area 2 and the first protective sheet 16, a structure is provided which enables a simple assembly of the airbag module 21 on the frame 28.

In the following the sequence of assembly of an airbag module 21 on the frame 28 is explained. Just like the previous statements regarding the first embodiment example the following statements also relate to a side airbag. However, the invention is in no way limited only to side airbags.

The cushion 26 is positioned on the frame 28 and encloses the frame 28 completely on the front, top and side. Towards the bottom at the rear there is almost no enclosure, at the rear there is enclosure on both sides and at the top the cushion 26 easily encompasses the frame 28. As a result cushion 26 and frame 28 are loosely connected to each other.

The decorative cover 1 is positioned correctly, turned inside out, opposite the frame 28 or the cushion assemblage by causing openings in the cushion 26 to overlap with allocated openings in the decorative cover 1.

The decorative cover 1 is turned right-side out and, during this process, pulled over the frame 28 or the cushion assemblage. The position of the decorative cover 1 is then comprehensively corrected, with the result that it rests against the cushion 26 as per specification. Towards the rear the decorative cover 1 is largely open—the space between the cushion 26 and the frame 28 thus remains accessible.

The first protective sheet 16 including the first support bar 10 is brought through the slit 27 located in the side area of the cushion 26 from the cushion side facing the decorative cover 1 onto the cushion side facing the frame 28.

The airbag module 21 is added and the first support bar 10 fastened to the free end of the first protective sheet 16 is pushed with its recesses onto the connection pins 24 protruding from the airbag module 21.

The connection pins 24 of the airbag module 21 are made to overlap with the allocated fastening holes 30 in the frame 28 and pushed through these.

Nuts 29 are screwed, at first by hand, onto the free ends of the connection pins 24. The airbag module 21 and the first support bar 10 are then screwed to the frame 28 with an electronic torque-angle wrench.

The data from the electronic torque-angle wrench are archived. It is thus documented that the airbag module 21 has been connected as per specification to the frame 28, with the result that the first support bar 10, and thus the first protective sheet 16, has been assembled in the correct position, and thus damage to the cushion 26 during the ignition process of the airbag 25 is effectively prevented.

Figure 4:
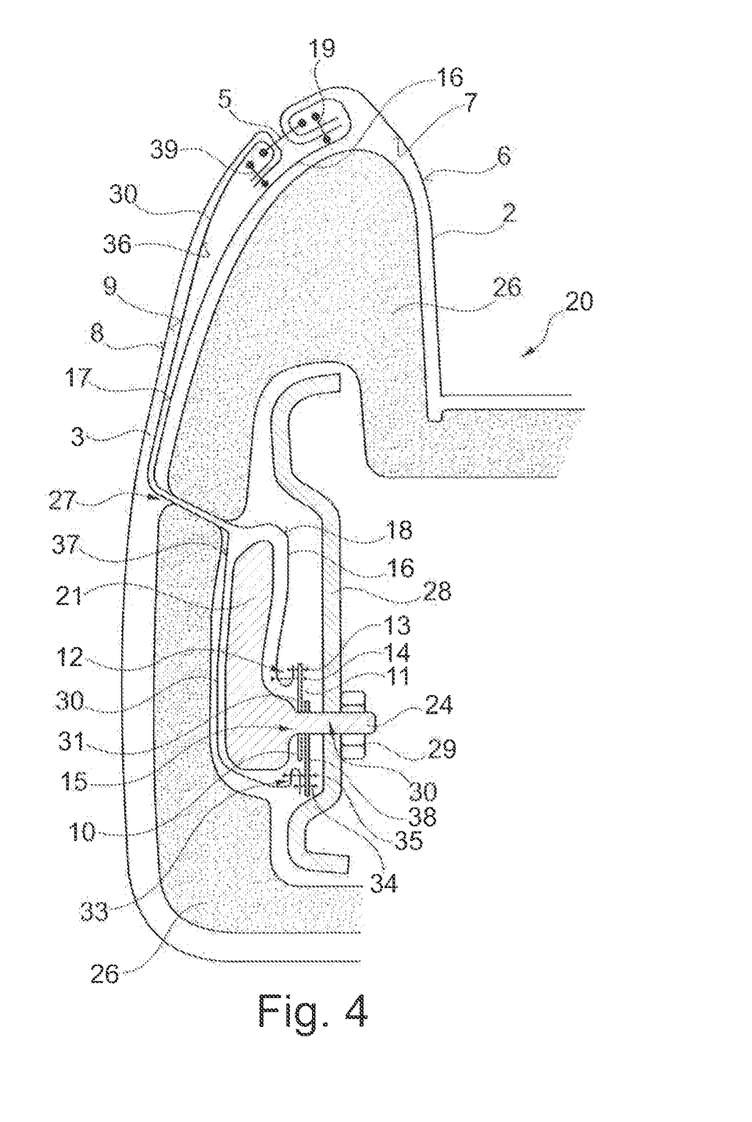
Figure 5:
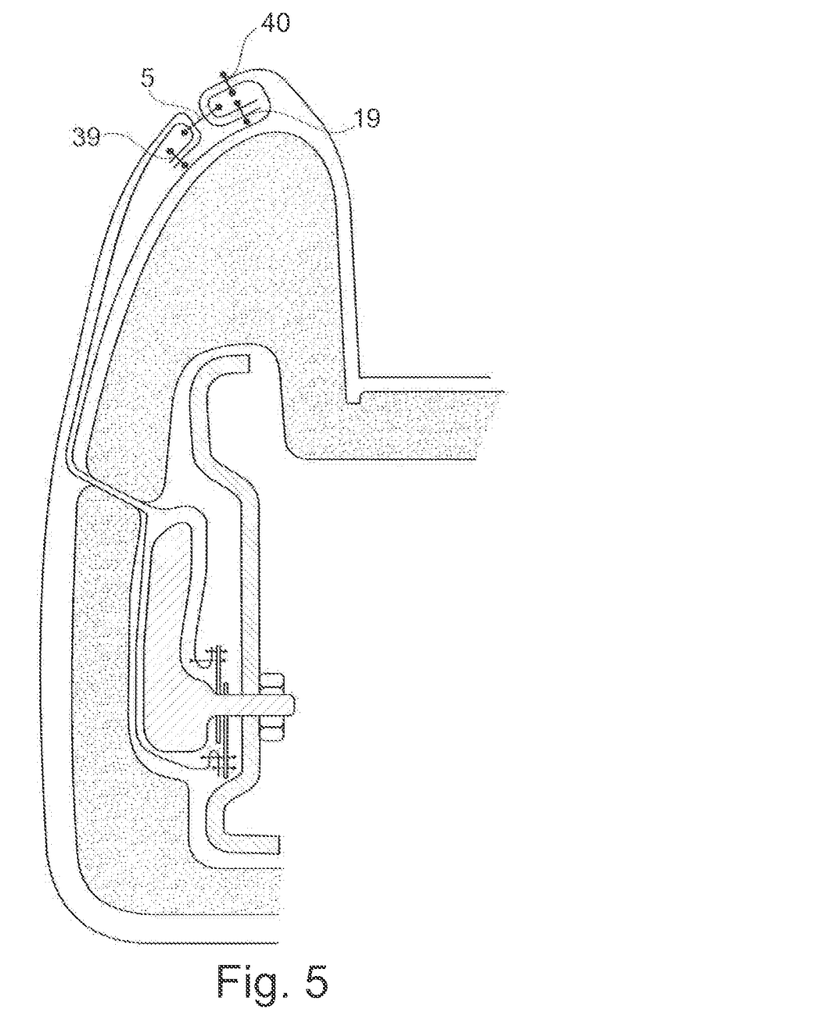
Figure 6:
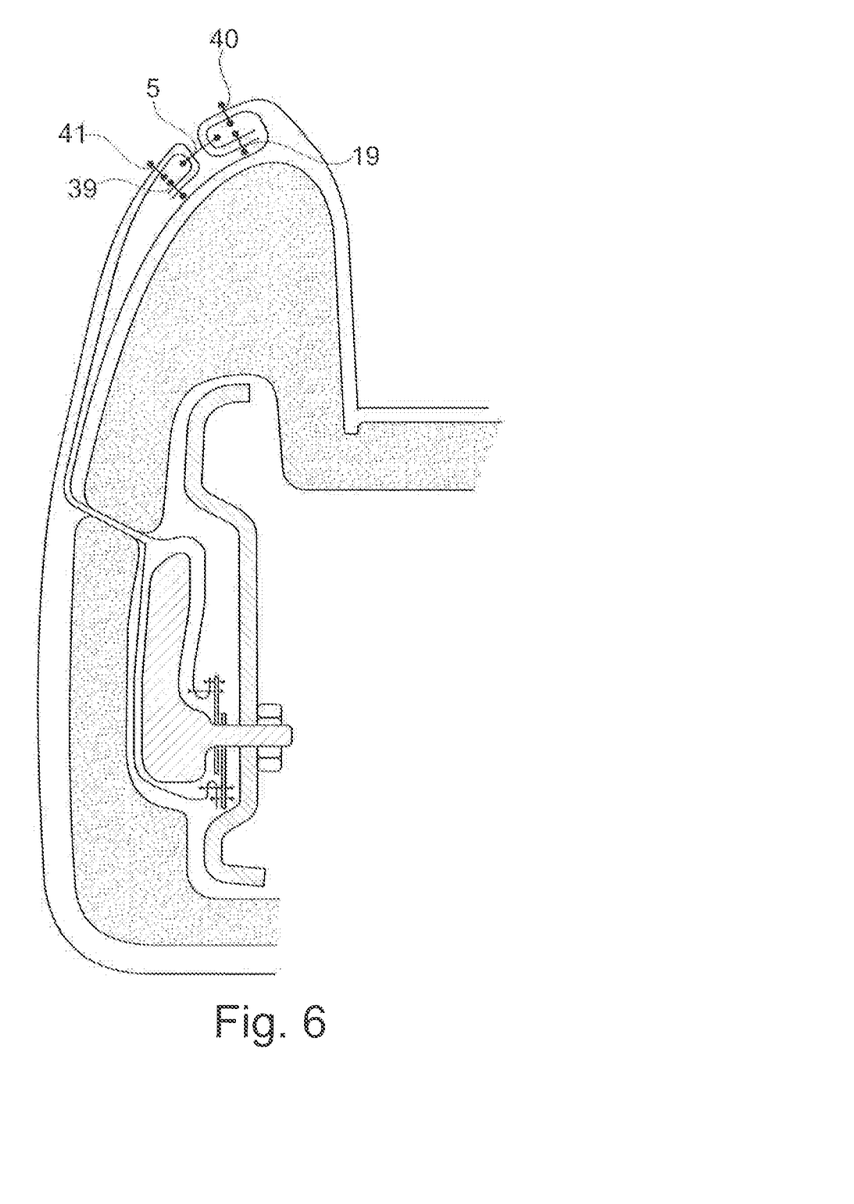

A horizontal section of the side area of the backrest represented on the right in FIG. 1 is represented in FIGS. 4 to 6 in each case. These are the second, third and fourth embodiment examples, which [ . . . ] only by the connections used in the area of the connection of the front decorative area 2 to the rear decorative area 3.

The only difference between the second embodiment example of FIG. 4 and the first embodiment example according to FIG. 2 is that, not only is the first protective sheet 16 which is connected to the first support bar 10 present, but in addition also a second protective sheet 32—which has the same properties in respect of the tear resistance as the first protective sheet 16—which is connected to a second support bar 31.

The second protective sheet 32 has a fourth inner surface 37, which points away from the frame 28, and a fourth outer surface 36, which is opposite the frame 28. The second protective sheet 32 has a height of from approximately 10 to 25 cm—preferably approx. 18 cm—which approximately corresponds to the height of the second support bar 31. It—as well as the height of the second support bar 31—is matched to the height of the slit 27 in the cushion 26 and designed slightly smaller than the latter, in order that the second protective sheet 32, including the second support bar 31, can be guided well through the slit 27 during assembly.

The second support bar 21 is preferably constructed identically to the first support bar 10—with regard to both the dimensions and the material and other features—and is located on the connection pins 24 between the first support bar 10 and the frame 28. It is arranged mirror-inverted relative to the first support bar 10, with the result that it is connected, in its rear area 38 which is located behind the connection pins 24 viewed in the direction of travel, to the second protective sheet 32 by means of a fourth connection 33. The fourth connection 33 is formed as a mirror image of the second connection 12 between the first support bar 10 and the second protective sheet 16. The third partial connection 34 is formed in the area of the edge. Here the fourth outer surface 36 rests against the second support bar 31. The second protective sheet 32 extends from the third partial connection 34 in FIG. 4 firstly upwards as far as the fourth partial connection 35. There the second protective sheet 32 changes its direction by 180°—it is thus turned down at this site, with the result that it extends doubled downwards from there in FIG. 4, with the result that the fourth inner surfaces 37 on the two sheets come to rest against each other. For this, the fourth partial connection 35 comprises both sheets and the second support bar 31. For the two partial connections 34, 35 in each case a seam can be produced from one thread, wherein the thread is pushed through the plastic of the second support bar 31 by means of a suitable needle.

The second protective sheet 32 extends from the fourth connection 33 away through the slit 27 in the cushion 26. It is connected in a tear-resistant manner to the rear decorative cover 3 via a fifth connection 39 in the area of the edges of the second protective sheet 32 and of the rear decorative cover 23. The second inner surface 9 of the rear decorative cover 3 and the fourth inner surface 37 of the second protective sheet 32 rest against each other. In the embodiment example represented the second protective sheet 32 is also comprised by the first connection 5 in the area of which the same surfaces of the rear decorative cover 3 and of the second protective sheet 32 as for the fifth connection 39 rest against each other.

The airbag guide is formed by the first protective sheet 16 and the second protective sheet 32 in the second embodiment example—the same applies to the third and fourth embodiment examples of FIGS. 5 and 6. On the front side the airbag 25 is guided by the first protective sheet 16, and on the rear side by the second protective sheet 32, with the result that it cannot damage or destroy the cushion 26.

The third embodiment example represented in FIG. 5—like the second embodiment example represented in FIG. 4—has a second protective sheet 32, likewise in addition to the first protective sheet 16. These two embodiment examples differ only in the area of the first connection 5, with the result that reference numbers in FIG. 5 are only drawn in for the features found in this area.

In addition to the connections already known from FIG. 4—first connection 5, third connection 19 and fifth connection 39—a sixth connection 40 is also present. This is formed opposite the third connection 19 in the area between the first connection 5 and the second connection 12 and comprises the front decorative cover 2 and the first protective sheet 16. An advantage of such an additional sixth connection 40 is the possibility of varying aesthetic design elements. The sixth connection 40 is a design seam and serves exclusively for visual variation or emphasis. It has no functional significance.

The only difference between the fourth embodiment example of FIG. 6 and the third embodiment example of FIG. 5 is that there is a seventh connection 41 in the area of the first connection 5; therefore only the features located in this area are also drawn in FIG. 6. The seventh connection 41 is formed opposite the fifth connection 39 in the area between the first connection 5 and the fourth connection 33 and comprises the rear decorative cover 3 and the second protective sheet 32. It is also—like the sixth connection 40—purely a design seam. The same advantages are hereby achieved for the rear part as for the front part by the sixth connection 40 of the third embodiment example.

The assembly, including documentation for determining whether the airbag module 21 including the first and second protective sheets 16, 32—together with the first and second support bars 10, 31 firmly connected to these—is correctly fastened to the frame 28, is substantially identical to what has already been described above regarding the first embodiment example of FIGS. 2 and 3, with a single change: not only is the first support bar 10, which is fastened to the free end of the first protective sheet 16, pushed with its recesses onto the connection pins 24 protruding from the airbag module 21, but additionally also the second support bar 31, which is fastened to the free end of the second protective sheet 32, with its recesses.

LIST OF REFERENCE NUMBERS 1 decorative cover
2 front decorative cover area
3 rear decorative cover area
4 vehicle seat
5 first connection
6 first outer surface
7 first inner surface
8 second outer surface
9 second inner surface
10 first support bar
11 front area
12 second connection
13 first partial connection
14 second partial connection
15 through hole
16 first protective sheet
17 third outer surface
18 third inner surface
19 third connection
20 seat area
21 airbag module
22 cover
23 base body
24 connection pin
25 airbag
26 cushion
27 slit
28 frame
29 fixing means, nut
30 fastening hole
31 second support bar
32 second protective sheet
33 fourth connection
34 third partial connection
35 fourth partial connection
36 fourth outer surface
37 fourth inner surface
38 rear area
39 fifth connection
40 sixth connection
41 seventh connection

The invention claimed is:
1. Structure for receiving an inflatable airbag (25) which is located in a housing of an airbag module (21), with a decorative cover (1) for covering a component of a vehicle seat (4), wherein the decorative cover (1) has a front decorative cover area (2) and a rear decorative cover area (3), wherein the front decorative cover area (2) and the rear decorative cover area (3) are connected to each other in the area of their edge sections via a first connection (5) that can be released when the airbag (25) is deployed, wherein the front decorative cover area (2) has a first outer surface (6) and a first inner surface (7) and the rear decorative cover area (3) has a second outer surface (8) and a second inner surface (9), with a first support bar (10) made of a rigid material, which has at least one through hole (15) for receiving a connection pin (24) which is formed on the housing of the airbag module (21), and which has fastening means for fastening a first protective sheet (16), wherein the first support bar (10) has a front area (11) which, in the installed position, lies in front of the at least one through hole (15) in the direction of travel, with a first protective sheet (16) which has a third outer surface (17) and a third inner surface (18), wherein the first protective sheet (16) is made of a material that is tear-resistant when the airbag (25) is deployed, wherein the first protective sheet (16) is connected to the first support bar (10) in its front area via a second connection (12) that cannot be released when the airbag is deployed, such that its third inner surface (18) faces the first support bar (10), and the first protective sheet (16) is connected to the front decorative cover area via a third connection (19) that cannot be released when the airbag (25) is deployed, such that the third inner surface (18) of the first protective sheet (16) is opposite the first inner surface (7) of the front decorative cover area (2) in the area of its edge sections.

2. Structure according to claim 1 with a second support bar (31) made of a rigid material, which has at least one through hole (15) for receiving a connection pin (24) which is formed on the housing of the airbag module (21), and which has fastening means for fastening a second protective sheet (32), wherein the second support bar (31) has a rear area (38) which, in the installed position, lies behind the at least one through hole (15) in the direction of travel, with a second protective sheet (32) which has a fourth outer surface (36) and a fourth inner surface (37), wherein the second protective sheet (32) is made of a material that is tear-resistant when the airbag (25) is deployed, wherein the second protective sheet (32) is connected to the second support bar (31) in its rear area (38) via a fourth connection (33) that cannot be released when the airbag (25) is deployed, such that its fourth inner surface (37) faces the second support bar (31), and the second protective sheet (32) is connected to the rear decorative cover area (3) via a fifth connection (39) that cannot be released when the airbag (25) is deployed, such that the fourth inner surface (37) of the second protective sheet (32) is opposite the second inner surface (9) of the rear decorative cover area (3) in the area of its edge sections.

3. Structure according to claim 2, wherein the first and/or second support bar (10, 31) has two through holes (15) lying one above the other in the installed position, for receiving two connection pins (24) formed on the housing of the airbag module (21).

4. Structure according to claim 3, wherein the first and/or second support bar (10, 31) is formed of a stiff, impact-resistant plastic or a stiff metal or a stiff metal alloy.

5. Structure according to claim 4, wherein the first and/or second support bar (10, 31) has a thickness of from 1.5 to 10 mm, preferably 2 to 5 mm.

6. Structure according to claim 5, wherein the second connection (12) and/or the third connection (19) and/or the fourth connection (33) is a seam, an adhesive connection or a welded connection.

7. Structure according to claim 6, wherein, by means of the first connection (5), the first protective sheet (16) is additionally also fixed with its third inner surface (18) against the first inner surface (7) of the front decorative cover 2 and/or the second protective sheet (32) is fixed with its fourth inner surface (37) against the second inner surface (9) of the rear decorative cover (3).

8. Structure according to claim 7, wherein the second connection (12) comprises a first partial connection (13) and a second partial connection (14), wherein in case of the first partial connection (13) the third outer surface (17) of the first protective sheet (16) and the surface of the first support bar (10) aligned outwards in an installed state rest against each other, and wherein the second partial connection (14) comprises the first protective sheet (16) doubled, wherein the third outer surface (17) and the surface of the first support bar (10) aligned outwards in the installed state rest against each other, and at the same time, in the case of the doubling, the third inner surface (18) of the first protective sheet (16) faces the first support bar (10).

9. Structure according to claim 8, wherein the fourth connection (33) comprises a third partial connection (34) and a fourth partial connection (35), wherein in case of the third partial connection (34) the fourth outer surface (36) of the second protective sheet (32) and the surface of the second support bar (31) aligned outwards in the installed state rest against each other, and wherein the third partial connection (34) comprises the second protective sheet (32) doubled, wherein the fourth outer surface (36) and the surface of the second support bar (31) aligned outwards in the installed state rest against each other, and at the same time, in the case of the doubling, the fourth inner surface (37) of the second protective sheet (32) faces the second support bar (31).

10. Vehicle seat (4) with a structure according to claim 9, with a frame (28) which has a number of fastening holes (30), matched in terms of number and spacing to the through holes (15) present in the first and/or second support bar (10,31), with the airbag (25) which is located in a housing of the airbag module (21) and on the housing of which a number of connection pins (24), matched in terms of number and spacing the to through holes (15) present in the first and/or second support bar (10, 31), are arranged, with a cushion (26) which has a slit (27) a length of which is greater than the width of a first and/or second protective sheet (16, 32), and which is attached to the frame (28), wherein a decorative cover (1) surrounds the cushion (26), wherein the first and/or second protective sheet (16, 32) extends through the slit (27) in the cushion (26), wherein the connection pin (24) or the connection pins (24) of the housing of the airbag module (21) reaches or reach through the through hole (15) or the through holes (15) in the first and/or second support bar (10, 31) and through the fastening hole (30) or the fastening holes (30) in the frame (28), and with a fixing means (29) which is allocated to each connection pin (24) and which interacts with the allocated connection pin (24)

on the side of the frame (28) facing away from the first and/or second support bar (10, 31) such that there is a secure connection between the airbag module (21) and the frame (28).

11. Vehicle seat according to claim 10, wherein at its or their ends the connection pin (24) or the connection pins (24) has or have external threads which interact with internal threads on the fixing means (29), which are formed as nuts.

12. Vehicle seat according to claim 10, wherein the housing of the airbag module (21) has a pivotable cover (22) which, when the airbag (25) is in the deployed state, pushes the part of the cushion (26) lying behind the slit (27) relative to the front side of the vehicle seat (4) outwards away from the first and/or second support bar (10, 31).

13. Method for assembling a protective sheet (16, 32) fastened to a decorative cover (1) for protecting a cushion (26) of a backrest of a vehicle seat (4) in case of ignition of an airbag (25), wherein a support bar (10, 31) firmly connected to the protective sheet (16, 32) is screwed, together with the airbag module (21), to a frame (28) of the vehicle seat (4) by means of a documentation-capable assembly device, wherein the correct positioning and the proper fixing of the airbag module (21) and the protective sheet (16, 32) in parallel is ensured by evaluation and archiving of the data from the documentation-capable assembly device with which a screwing process of a fixing means (29) is carried out and monitored.

14. Method according to claim 13, wherein a torque-angle wrench is used as documentation-capable assembly device, and the torque-angle wrench detects by what rotation angle the fixing means, a nut, can still continue to be rotated after a first torque threshold has been reached, until a second torque threshold is reached.

* * * * *